March 3, 1964  S. E. FISHER  3,123,047
MOLDED RAWHIDE
Filed July 28, 1961

Stanton E. Fisher
INVENTOR.
BY
Attorney

United States Patent Office 3,123,047
Patented Mar. 3, 1964

3,123,047
MOLDED RAWHIDE
Stanton E. Fisher, 706 Lantern, St. Louis 3, Mo.
Filed July 28, 1961, Ser. No. 127,513
5 Claims. (Cl. 119—29.5)

This invention relates to a process of molding rawhide and to molded rawhide products as articles of manufacture. This invention also relates to molded rawhide animal toys.

Commercial rawhide is available in sheets, such as in skin or hide form. Shaping rawhide is quite difficult and time consuming since it involves tedious hand operations. In doing this the rawhide sheet must first be wet to make it pliable and while in this state it is shaped. The natural thickness of rawhide often limits the thickness of the finished product.

Animal toys for carnivorous animals such as dogs have become increasingly popular in recent years. In view of the fondness of dogs for bones, it is quite desirable to have a simulated animal bone useful as a dog toy or pacifier. However, it is highly desirable to prepare a product which is appealing, long-lasting, and safe for dogs. In addition, the product should be non-staining so that the furniture, floor covering, clothing, etc. are protected from damage.

I have now discovered a method of molding rawhide which comprises subdividing rawhide into smaller particles, molding said smaller rawhide particles while wet into the desired shape, and then drying the product.

I have also discovered a simulated animal bone made of molded rawhide possessing desirable properties which are useful as a toy for carnivorous animals such as dogs. Dogs are particularly fond of this product since it looks like a bone. Being of animal origin, it has an animal odor which is appealing to dogs. Although hard, when chewed it has a certain amount of "give" without disintegrating within a short period of time and is thus a long-lasting product. Since the product is reconstituted rawhide of increased density, the life of the product is prolonged when subjected to animal chewing since a denser product is more resistant to moisture absorption. If a piece of rawhide is swallowed by the dog, it can be digested by the animal, in a manner of meat. Furthermore, the dog owners do not object to this product since it is harmless to dogs and will not stain the household. Other animal toys of molded hawhide are similarly appealing.

Increased strength is imparted to the molded product if it is prepared from threads, strands, chips, shavings, fibers, etc. However, these threads, strands, etc. can also be combined with comminuted rawhide and molded. Subdivided pieces may be obtained by cutting the rawhide into pieces of desired size or by beating rawhide as to loosen the collagen or fiber structure, etc., introducing said rawhide into a mold while wet where the desired configuration is imparted thereto and then drying the product. By way of non-limiting example, these subdivided pieces can be at least ½ in. long, such as ½" to 2" or more long, for example ¾" to 1½" but preferably ¾" to 1" long. They can be at least 1/32" wide, such as 1/32" to ¼" or more, for example 1/16" to ¼", but preferably ⅛ to 3/16 inch wide. In practice, minimum length and thickness is more significant than the maximum length and thickness provided the subdivided pieces are of reasonable size to be handled in the mold. In practice the thickness is the natural thickness of the rawhide, for example .007 to 0.015 in. thick. Since many subdivided pieces may be unsymmetrical the above figures may be considered average length and widths.

By means of the present invention rawhide is not only facilely shaped but is also reconstituted into a product of increased density. The life of the product thus produced is prolonged when subjected to animal chewing since the denser product is more resistant to moisture absorption than natural rawhide.

By means of the present process: (1) previously unusable scraps of rawhide can be employed; (2) the possible configurations of rawhide products are infinite as compared to those derived from rawhide sheets; (3) the molded product is in essence reconstituted rawhide, compacted so as to be of greater density and moisture resistance and therefore of longer life than those derived from rawhide sheets.

By means of the present process all shapes and forms of products can be made, for example, in the form of balls, rings, simulated animal bones, dolls, etc. In fact, almost any shape in the product is possible.

My invention is illustrated only, and not limited, in the following drawings.

Figure 1:
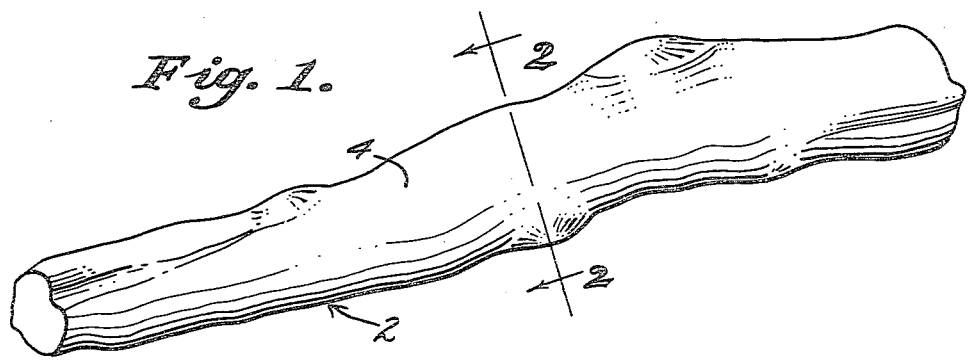
FIGURE 1 is a view in perspective of my simulated dog pacifier.
Figure 2:
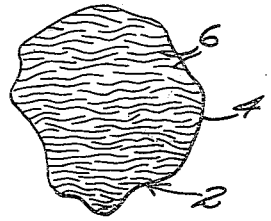
FIGURE 2 is a view in section taken along line 2—2 of FIGURE 1 showing the particles of one embodiment of my simulated dog pacifier.
Figure 3:
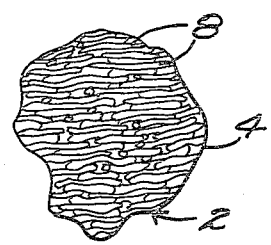
FIGURE 3 is a view in section taken along line 2—2 of FIGURE 1 showing the particles of another embodiment of my simulated dog pacifier.
Figure 4:
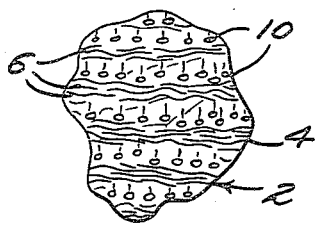
FIGURE 4 is a view in section taken along line 2—2 of FIGURE 1 showing the particles of another embodiment of my simulated dog pacifier.
Figure 5:
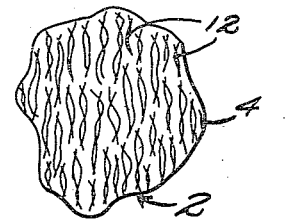
FIGURE 5 is a view in section taken along line 2—2 of FIGURE 1 showing the particles of another embodiment of my simulated dog pacifier.

More specifiically, referring in FIGURE 1, I provide simulated dog pacifier 2 shaped in the form of a stick. Simulated dog pacifier 2 comprises body portion 4 consisting essentially of small rawhide particles closely compacted and reconstituted to simulate an animal chewing device. Making reference to FIGURE 2, said rawhide particles are threads 6; making reference to FIGURE 3, said rawhide particles are strands 8; making reference to FIGURE 4, and said rawhide particles are comminuted rawhide 10 and threads 6; and making reference to FIGURE 5, said rawhide particles are beaten, loosened fibers 12.

The following non-limiting examples are presented for purposes of illustration and not of limitation. In each example, the following shaped products are formed—(1) an animal bone with one joint; (2) an animal bone having two joints, each terminal; (3) a ball; (4) a ring and (5) a stick.

*Example 1*

Sheets of rawhide are introduced into a shaving machine and the hides reduced to shavings approximately ¾–1" long, ⅛–3/16" wide and 0.007–.015" thick. These shavings are wet with water, molded into the desired shape by compacting into a mold and then dried.

*Example 2*

Pieces from rawhide sheets are forced together into a compact mass and this mass is then treated as a hide and reduced to shavings, which are approximately the same size as those of Example 1, which when wet, are similarly molded into the desired shape and dried.

*Example 3*

The above example 1 is repeated except that the molded product is made from equal weights of comminuted rawhide and rawhide shavings.

*Example 4*

Pieces of rawhide are broken down by beating them so as to loosen the collagen or fiber structure. Fibers from the beaten product are then wet with water, molded into the desired shape and dried. Since these collagen or fiber structures impart strength and flexibility to the original rawhide, their presence in the final molded product enables it to retain these properties originally present and at the same time to increase its density when molded.

Although one may add other components to the rawhide prior to molding such as adhesives, resins, etc., in products for animals I prefer the molded product containing little, if any, component other than rawhide.

The use of rawhide is critical to this invention. Rawhide leather is animal skin or hide which has been dehaired and then dried. No tanning is involved in its manufacture. Suitable definitions of rawhide can be found in many texts on leather, for example, in the Hide, Leather and Shoe Encyclopedia.

While certain representative embodiments and details have been shown for purposes of illustration, it will be apparent to those skilled in the art that various modifications may be made herein without departing from the spirit or scope of this invention.

Having thus described my invention what I claim as new and desire to obtain by Letters Patent is:

1. A simulated dog pacifier comprising a substantially homogeneous body portion consisting essentially of small rawhide particles closely compacted and reconstituted to simulate an animal chewing device.
2. The simulated dog pacifier of claim 1 wherein said rawhide particles are threads.
3. The simulated dog pacifier of claim 1 wherein said rawhide particles are strands.
4. The simulated dog pacifier of claim 1 wherein said rawhide particles comprise comminuted rawhide.
5. The simulated dog pacifier of claim 1 wherein said rawhide particles are beaten, loosened fibers.

References Cited in the file of this patent
UNITED STATES PATENTS

| | | |
|---|---|---|
| 213,733 | Bliss | Apr. 1, 1879 |
| 1,133,957 | Herman | Mar. 30, 1915 |
| 1,600,194 | Miller | Sept. 14, 1926 |
| 1,651,962 | Miller | Dec. 6, 1927 |
| 2,185,547 | Fowler | Jan. 2, 1940 |
| 2,257,726 | Emmett et al. | Oct. 7, 1941 |
| 2,988,045 | Fisher | June 13, 1961 |
| 3,006,177 | Holmes | Oct. 31, 1961 |